(12) United States Patent
Ringen

(10) Patent No.: US 8,549,118 B2
(45) Date of Patent: Oct. 1, 2013

(54) UPDATING A DOMAIN NAME SERVER WITH INFORMATION CORRESPONDING TO DYNAMICALLY ASSIGNED INTERNET PROTOCOL ADDRESSES

(75) Inventor: Deron Ringen, Acworth, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 928 days.

(21) Appl. No.: 12/634,779

(22) Filed: Dec. 10, 2009

(65) Prior Publication Data

US 2011/0145377 A1   Jun. 16, 2011

(51) Int. Cl.
*G06F 15/177* (2006.01)
(52) U.S. Cl.
USPC ............ 709/222; 709/224; 709/245; 370/401
(58) Field of Classification Search
USPC .......... 709/220–224, 245–246; 370/400–401
See application file for complete search history.

(56) References Cited

U.S. PATENT DOCUMENTS

| | | | |
|---|---|---|---|
| 6,847,649 B2 * | 1/2005 | Sutanto | 709/224 |
| 7,600,042 B2 | 10/2009 | Lemson et al. | |
| 7,990,949 B2 * | 8/2011 | Karaoguz et al. | 370/401 |
| 8,019,880 B2 * | 9/2011 | Xiong et al. | 709/229 |
| 8,159,985 B2 * | 4/2012 | Karaoguz et al. | 709/223 |
| 8,194,641 B2 * | 6/2012 | Corley et al. | 370/401 |
| 8,369,265 B2 * | 2/2013 | Vendrow et al. | 370/401 |
| 8,374,088 B2 * | 2/2013 | Balay et al. | 709/225 |
| 2003/0053443 A1 * | 3/2003 | Owens | 370/401 |
| 2006/0075139 A1 * | 4/2006 | Jungck | 709/245 |
| 2009/0144419 A1 | 6/2009 | Riordan et al. | |
| 2009/0225762 A1 * | 9/2009 | Davidson et al. | 370/401 |
| 2010/0313251 A1 * | 12/2010 | Carolan et al. | 709/221 |

OTHER PUBLICATIONS

"Domain Name System", Wikipedia, the free encyclopedia. Retrieved: Oct. 30, 2009. <http://en.wikipedia.org/w/index.php?title=Domain_Name_System>.
Perry, Scott R., "DNS Oversimplified: How to check your DNS", Oct. 22, 2008. <http://rscott.org/dns/>.

* cited by examiner

*Primary Examiner* — Bharat N Barot
(74) *Attorney, Agent, or Firm* — Toler Law Group, PC

(57) ABSTRACT

A computer implemented method includes receiving a broadband connection request from a remote computing device at a broadband service provider access device. The broadband connection request includes a broadband subscriber identifier. The computer implemented method includes dynamically assigning an Internet Protocol (IP) address to the remote computing device in response to receiving the broadband connection request. The computer implemented method also includes sending a message to a domain name server to update a record that includes a domain name associated with the broadband subscriber identifier to include the IP address assigned to the remote computing device.

20 Claims, 5 Drawing Sheets

UPDATING A DOMAIN NAME SERVER WITH INFORMATION CORRESPONDING TO DYNAMICALLY ASSIGNED INTERNET PROTOCOL ADDRESSES

FIELD OF THE DISCLOSURE

The present disclosure is generally related to providing name services for dynamically assigned Internet Protocol (IP) addresses.

BACKGROUND

When a computing device connects to a public network, such as the Internet, the computing device is assigned an Internet Protocol (IP) address. The rapid proliferation of personal computing devices has resulted in a demand for a large number of IP addresses. To address this demand, Internet Service Provides (ISPs) may use Dynamic Host Configuration Protocol (DHCP) to dynamically assign an IP address to a computing device when the computing device initiates a connection to a network of the ISP. When a computing device disconnects from the network, the IP address assigned to the computing device may be reassigned to another computing device.

The Internet uses a domain name system in which human readable domain names (e.g., www.xyz.com) may be resolved to a numerical identifier (e.g., 208.77.188.166) that is associated with an address of a server hosting a website associated with the domain name. Each ISP may use a Domain Name Server (DNS) to resolve a particular domain name to an associated numerical identifier.

For a business XYZ that has an associated website, such as www.xyz.com, when a server that hosts the website is booted or rebooted, the server may be dynamically assigned an IP address. The DNS may be notified of the newly assigned IP address several hours after the server is assigned the IP address because the DNS may be sent periodic updates that include the dynamically assigned IP address. Until the DNS is updated with the dynamically assigned IP address, attempts to reach the website www.xyz.com may be resolved by the DNS to an incorrect (e.g., stale) IP address.

DETAILED DESCRIPTION

Figure 1:
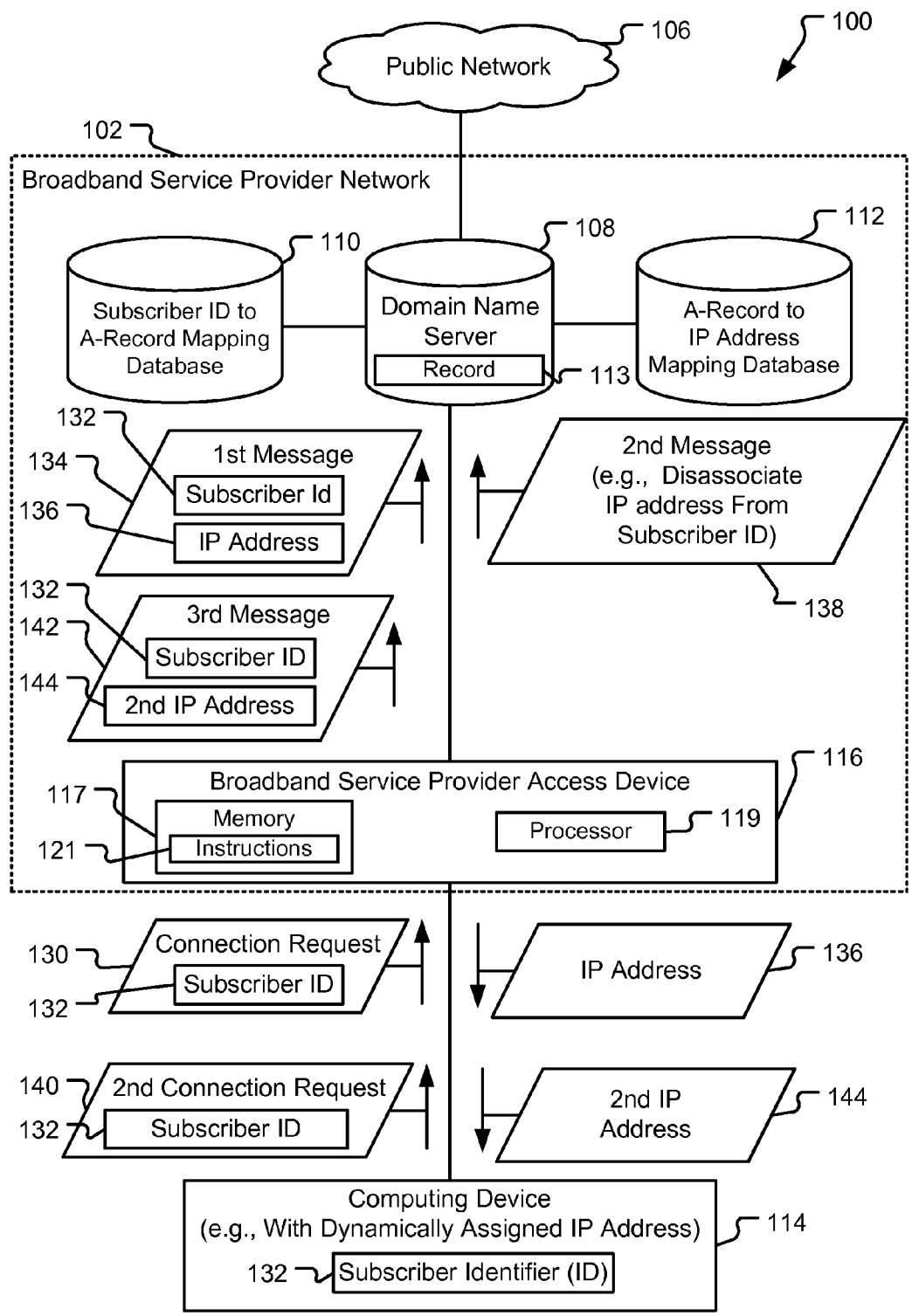
FIG. 1 is a block diagram of a first particular embodiment of a system to provide name services for dynamically assigned IP addresses.

A broadband service provider access device (e.g., an edge network element device) receives a broadband connection request from a remote computing device. The broadband connection request includes a broadband subscriber identifier (e.g., a user name and a password associated with a subscriber). In response to receiving the broadband connection request, the broadband service provider access device dynamically assigns an Internet Protocol (IP) address to the remote computing device. The broadband service provider access device sends a message to a domain name server to update a record that maps a domain name associated with the broadband subscriber identifier to the IP address that is assigned to the remote computing device. The broadband service provider access device sends the message to the domain name server substantially simultaneously with sending the IP address to the remote computing device. By doing so, the domain name server may update the record that maps the domain name associated with the broadband subscriber identifier to the IP address that is assigned to the remote computing device to prevent the record from including a stale IP address.

In a particular embodiment, a computer implemented method includes receiving a broadband connection request from a remote computing device at a broadband service provider access device. The broadband connection request includes a broadband subscriber identifier. The computer implemented method includes dynamically assigning an Internet Protocol (IP) address to the remote computing device in response to receiving the broadband connection request. The computer implemented method also sends a message to a domain name server to update a record that includes a domain name associated with the broadband subscriber identifier and includes the IP address assigned to the remote computing device.

In another particular embodiment, a domain name server includes a processor and a computer-readable storage medium. The computer-readable storage medium includes operational instructions that, when executed by the processor, cause the processor to receive a first message from a broadband service provider access device. The first message includes a broadband subscriber identifier and a first Internet Protocol (IP) address of a remote computing device. The first IP address is dynamically assigned to the remote computing device by the broadband service provider access device. The first message is sent from the broadband service provider access device when the broadband service provider access device sends an assignment message to the remote computing device. The assignment message includes the first IP address assigned to the remote computing device. The computer-readable storage medium includes operational instructions that, when executed by the processor, cause the processor to update an A-record stored at the domain name server to associate the broadband subscriber identifier with the first IP address assigned to the remote computing device.

In another particular embodiment, a computer-readable storage medium includes operational instructions that, when executed by the processor, cause the processor to receive a broadband connection request from a remote computing device at a broadband service provider access device. The broadband connection request includes a broadband subscriber identifier. The computer-readable storage medium includes operational instructions that, when executed by the processor, cause the processor to dynamically assign an Internet Protocol (IP) address to the remote computing device in response to receiving the broadband connection request. The computer-readable storage medium includes operational instructions that, when executed by the processor, cause the processor to send a message to a domain name server to update a record that includes a domain name associated with the broadband subscriber identifier and the IP address assigned to the remote computing device.

Referring to FIG. 1, a block diagram of a first particular embodiment of a system to provide name services for dynamically assigned Internet Protocol (IP) addresses is depicted and generally designated 100. The system 100 includes a broadband service provider network 102 coupled to a public network 106.

The broadband service provider network 102 includes a domain name server 108 coupled to a subscriber identifier (ID) to A-Record mapping database 110, an A-record to IP address mapping database 112, and a broadband service provider access device 116. A computing device 114 is coupled to the broadband service provider access device 116. The computing device 114 may be physically located at a different location (e.g., a location that is remote) from the domain name server 108.

The public network 106 may be a Public Switched Telephone Network (PSTN), a wireless network, a broadband network, an IP-based network, or any combination thereof. For example, the public network 106 may be the Internet. Additional broadband service provider networks (not shown) may be coupled to the public network 106.

The broadband service provider network 102 may provide broadband services to one or more computing devices, such as the computing device 114. Subscribers of services provided by a broadband service provider may access the public network 106 via the broadband service provider network 102.

The domain name server 108 may be associated with the broadband service provider network 102. The domain name server 108 may translate domain names that are meaningful to humans (e.g., www.att.com) into numerical identifiers associated with networking equipment (e.g., 208.77.188.166). The domain name server 108 may store a record, such as an Address-Record (e.g., A-Record), to enable the domain name server 108 to resolve a domain name to an IP address. For example, the record 113 may be an A-Record that maps the domain name www.att.com to an IP address 208.77.188.166. The domain name server 108 may receive a query to resolve the domain name www.att.com. The domain name server 108 may determine that the domain name www.att.com resolves to the IP address 208.77.188.166 based on the record 113. The domain name server 108 may return the IP address 208.77.188.166 in response to the query to resolve the domain name www.att.com. The domain name server 108 may store and update various records associated with domain names, such as the representative record 113, records stored at the subscriber ID to A-Record mapping database 110, and records stored at the A-Record to IP address mapping database 112. The subscriber ID to A-Record mapping database 110 may associate particular subscriber IDs to particular A-records. The A-record to IP address mapping database 112 may associate particular A-records to particular IP addresses. When the domain name server 108 receives a query that references a particular domain name, the domain name server 108 may use the subscriber ID to A-Record mapping database 110 and the A-Record to IP address mapping database 112 to retrieve an IP address associated with the particular domain name, enabling the particular domain name to be resolved to the associated IP address.

The broadband service provider access device 116 may be a network element located at an edge of the broadband service provider network 102. The broadband service provider access device 116 includes a memory 117 and a processor 119. The memory 117 includes instructions 121. The instructions 121 may be executable by the processor 119 to perform various functions of the broadband service provider access device 116. The broadband service provider access device 116 may provide access to the broadband service provider network 102 to computing devices of subscribers, such as the computing device 114.

The computing device 114 may be associated with a subscriber of the broadband service provider network 102. The computing device 114 may have a dynamically assigned IP address. The computing device 114 may include a subscriber ID 132 of the subscriber. For example, the subscriber ID may be a subscriber log-in name. The computing device 114 may be a personal computer, a laptop, a portable computing device, a personal digital assistant (PDA), a telephone, a media playback device, or any combination thereof.

In operation, the broadband service provider access device 116 may receive a connection request 130 including the subscriber ID 132 from the computing device 114. In response, the broadband service provider access device 116 may dynamically assign an IP address 136 to the computing device 114. The broadband service provider access device 116 may send a first message 134 to the domain name server 108 to update the record 113 to include the IP address 136. Substantially simultaneously with sending the first message 134 to the domain name server 108, the broadband service provider access device 116 may send the IP address 136 to the computing device 114. The computing device 114 may access the broadband service provider network 102 via the broadband service provider access device 116 after receiving the IP address 136. After receiving the first message 134 from the broadband service provider access device 116, the domain name server 108 may update the record 113 to associate the subscriber ID 132 with the IP address 136 assigned to the computing device 114.

The broadband service provider access device 116 may determine that the computing device 114 has disconnected from the broadband service provider network 102. The broadband service provider access device 116 may send a second message 138 to the domain name server 108. The second message 138 may indicate that the computing device 114 is not connected to the broadband service provider network 102. After receiving the second message 138 from the broadband service provider access device 116, the domain name server 108 may update the record 113 to disassociate the subscriber ID 132 from the IP address 136.

The computing device 114 may initiate a reconnection to the broadband service provider network 102 by sending a second connection request 140 to the broadband service provider access device 116. For example, the computing device 114 may initially connect to the broadband service provider network 102, disconnect from the broadband service provider network 102, and at a later time, reconnect to the broadband service provider network 102. The broadband service provider access device 116 may receive the second connection request 140 and assign a second IP address 144 to the computing device 114. The broadband service provider access device 116 may send the second IP address 144 to the computing device 114 substantially simultaneously with sending a third message 142 to the domain name server 108. The third message 142 may include the subscriber ID 132 and the second IP address 144 that is assigned to the computing device 114. After receiving the third message 142, the domain name server 108 may update the record 113 to associate the subscriber ID 132 with the second IP address 144.

Thus, the broadband service provider access device 116 may enable the domain name server 108 to update the record 113 associated with the subscriber ID 132 to include a current IP address associated with the computing device 114, such as the IP address 136 or the second IP address 144. The domain name server 108 may update the record 113 to include the current IP address of the computing device 114, enabling other computing devices accessing a domain name of the computing device 114 via the public network 106 to successfully obtain the IP address associated with the computing device 114. In this way, the broadband service provider access device 116 may dynamically assign an IP address to the computing device 114 and ensure that the domain name server 108 updates the record 113 to include the most recently assigned IP address, thereby preventing the record 113 from including a stale IP address.

Figure 2:
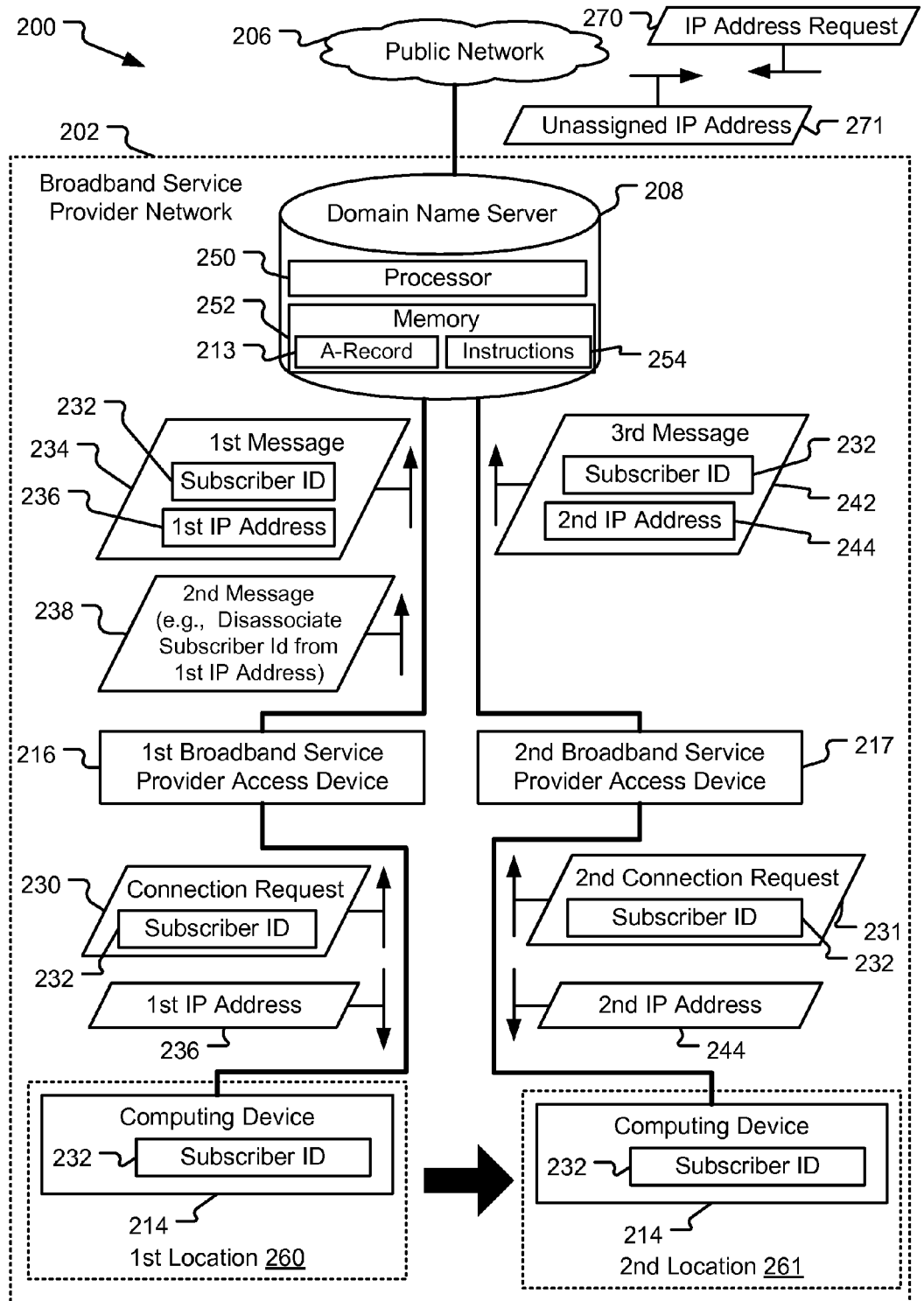
FIG. 2 is a block diagram of a second particular embodiment of a system to provide name services for dynamically assigned IP addresses.

Referring to FIG. 2, a block diagram of a second particular embodiment of a system to provide name services for dynamically assigned IP addresses is depicted and generally designated 200. The system 200 includes a broadband service provider network 202 coupled to a public network 206.

The public network 206 may include a Public Switched Telephone Network (PSTN), a wireless network, an optical network, an IP network, or any combination thereof. For example, the public network 206 may be the Internet. Additional broadband service provider networks (not shown) may be coupled to the public network 206.

The broadband service provider network 202 includes a domain name server 208 coupled to a first broadband service provider access device 216 and to a second broadband service access device 217. The broadband service provider network 202 may provide broadband services to one or more computing devices, such as the computing device 214. Subscribers of services provided by a broadband service provider may access the public network 206 via the broadband service provider network 202.

The domain name server 208 includes a processor 250 and a memory 252. The memory 252 includes instructions 254 and at least one A-record 213. The instructions 254 may be executable by the processor 250 to perform various functions of the domain name server 208. The domain name server 208 may be associated with the broadband service provider network 202. The domain name server 208 may translate domain names into numerical identifiers associated with networking equipment by storing and updating various records associated with domain names, such as the A-Record 213. When the domain name server 208 receives a query that references a particular domain name, the domain name server 208 may use the A-record 213 to retrieve an IP address associated with the particular domain name, enabling the particular domain name to be resolved to the associated IP address.

The broadband service provider access devices 216-217 may dynamically assign an IP address to computing devices to enable the computing devices to access the broadband service provider network 202. The broadband service provider access devices 216-217 may be network elements located at the edge of the broadband service provider network 202.

The computing device 214 may be a personal computer, a laptop, a portable computing device, a personal digital assistant (PDA), a telephone, a music playback device, or any combination thereof. The computing device 214 may be capable to accessing the broadband service provider network 202 via a dynamically assigned IP address. The computing device 214 may have an associated subscriber identifier 232.

In operation, the computing device 214 may send a connection request 230 to the first broadband service provider access device 216 requesting access to the broadband service provider network 202. The computing device 214 may be located at a first location 260. The first broadband service provider access device 216 may dynamically assign a first IP address 236 to the computing device 214. The first broadband service provider access device may send the first IP address 236 to the computing device 214 substantially simultaneously with sending a first message 234 to the domain name server 208. The first message 234 may include the subscriber ID 232 and the first IP address 236. The domain name server 208 may update an A-Record 213 associated with the subscriber ID 232 to map (e.g., associate) the subscriber ID 232 to the first IP address 236.

The first broadband service provider access device 216 may determine that the computing device 214 has disconnected from the broadband service provider network 202. In response, the first broadband service provider access device 216 may send a second message 238 to the domain name server 208. The second message 238 may request the domain name server 208 to disassociate the subscriber ID 232 from the first IP address 236. After receiving the second message 238, the domain name server 208 may update the A-Record 213 to identify that the subscriber ID 232 is no longer associated with the first IP address 236.

The domain name server 208 may receive an IP address request 270 via the public network 206. The IP address request 270 may request the domain name server 208 to retrieve an IP address associated with the computing device 214. When the computing device 214 has disconnected from the broadband service provider network 202, the computing device 214 is not associated with any particular IP address. The domain name server 208 may respond to the IP address request 270 with an unassigned IP address 271 when the computing device 214 has disconnected from the broadband service provider network 202.

After disconnecting from the broadband service provider network 202, the computing device 214 may be moved to a second location 261. The computing device 214 may initiate accessing the broadband service provider network 202 at the location 261 by sending a second connection request 231 including the subscriber ID 232 to the second broadband service provider access device 217. In response, the second broadband service provider access device 217 may assign a second IP address 244 to the computing device 214. The second broadband service provider access device 217 may send the second IP address 244 to the computing device 214 and, substantially simultaneously, send a third message 242 to the domain name server including the subscriber ID 232 and the second IP address 244. After receiving the third message 242, the domain name server 208 may update the A-Record 213 to map the subscriber ID 232 to the second IP address 244.

Thus, the domain name server 208 may receive messages from the broadband service provider access devices 216-217 when the computing device 214 is dynamically assigned an IP address. The domain name server 208 may update the A-Record 213 associated with the subscriber ID 232. Updating the A-record 213 may enable the domain name server 208 to respond to IP address requests with a current IP address associated with the subscriber ID 232 when the computing device 214 has a dynamically assigned IP address.

Figure 3:
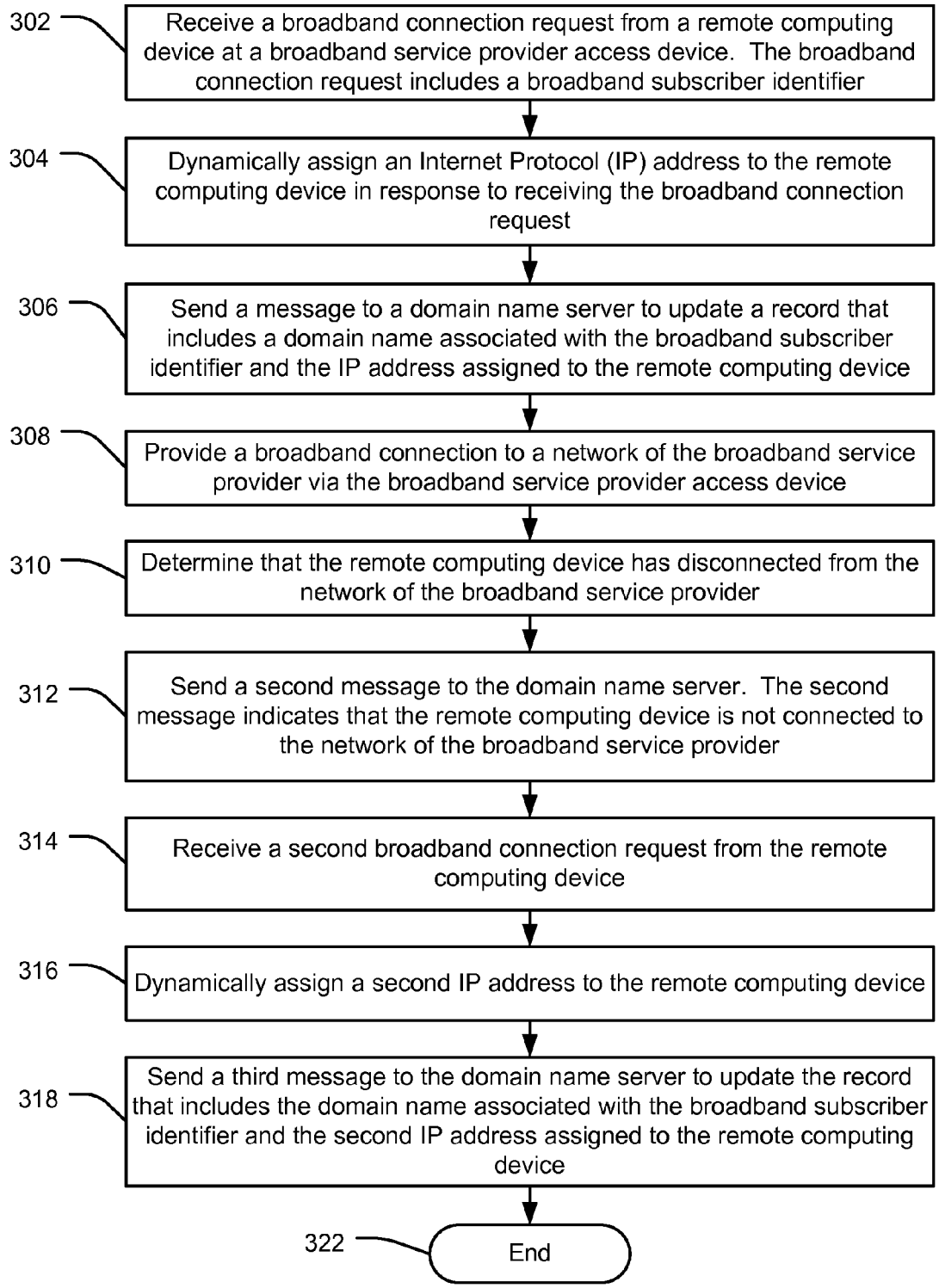
FIG. 3 is a flow diagram of a first particular embodiment of a method to provide name services for dynamically assigned IP addresses.

FIG. 3 is a flow diagram of a first particular embodiment of a method to provide name services for dynamically assigned IP addresses. The method may be performed by a broadband service provider access device, such as the broadband service provider access device 116 of FIG. 1, the broadband service provider access device 216 of FIG. 2, or the broadband service provider access device 217 of FIG. 2.

The method begins at 302, when a broadband connection request is received from a remote computing device at a broadband service provider access device. The broadband connection request includes a broadband subscriber identifier. The broadband subscriber identifier may include access credentials, such as a user name and password associated with a subscriber of the broadband service provider. Moving to 304, an IP address is dynamically assigned to the remote computing device in response to receiving the broadband connection request. For example, in FIG. 1, the broadband service provider access device 116 may assign the IP address 136 to the computing device 114 in response to receiving the connection request 130. Advancing to 306, a message is sent to a domain name server to update a record that includes a domain name associated with the broadband subscriber identifier and the IP address assigned to the remote computing device. For example, in FIG. 1, the broadband service provider access device 116 may send the first message 134 to the domain name server 108 to update the record 113 to include a domain name associated with the subscriber ID 132 that is in the IP address 136 assigned to the computing device 114. Proceeding to 308, a broadband connection to a network of the broadband service provider may be provided to the remote computing device via the broadband service provider access device.

Advancing to 310, a determination may be made that the remote computing device is disconnected from the network of the broadband service provider. Continuing to 312, a second message may be send to the domain name server. The second message may indicate that the remote computing device is not connected to the network of the broadband service provider. For example in FIG. 1, the broadband service provider access device 116 may send the second message 138 to the domain name server 108 after determining that the computing device 114 has disconnected from the broadband service provider network 102. The second message 138 may instruct the domain name server 108 to disassociate the IP address 136 from the subscriber ID 132. Moving to 314, a second broadband connection request may be received from the remote computing device, and a second IP address may be dynamically assigned to the remote computing device, at 316. Continuing to 318, a third message may be sent to the domain name server to update the record that includes the domain name associated with the broadband subscriber identifier to include the second IP address assigned to the remote computing device. For example, in FIG. 1, the broadband service provider access device 116 may receive the second connection request 140 and assign the second IP address 144 to the remote computing device 114 in response. The broadband service provider access device 116 may send the second IP address 144 to the computing device 114 and, substantially simultaneously, may send the third message 142 to the domain name server 108 to update the record 113 to include the second IP address 144. The method ends at 322.

Thus, a broadband service provider access device may dynamically assign an IP address when it receives a connection request from a computing device. The broadband service provider access device may send a message to a domain name server to associate the dynamically assigned IP address with a particular subscriber identifier. Substantially simultaneously, the broadband service provider access device may send the dynamically assigned IP address to the computing device. In this way, the domain name server may update a record that includes the currently assigned IP address associated with the subscriber identifier to enable the domain name server to provide the current IP address in response to IP address requests. When a server hosting a website is booted or rebooted, the server may be dynamically assigned an IP address. By immediately informing the domain name server of the newly assigned IP address, a query to a domain name associated with the website may be resolved to the newly assigned IP address rather than a stale IP address by the domain name server.

Figure 4:
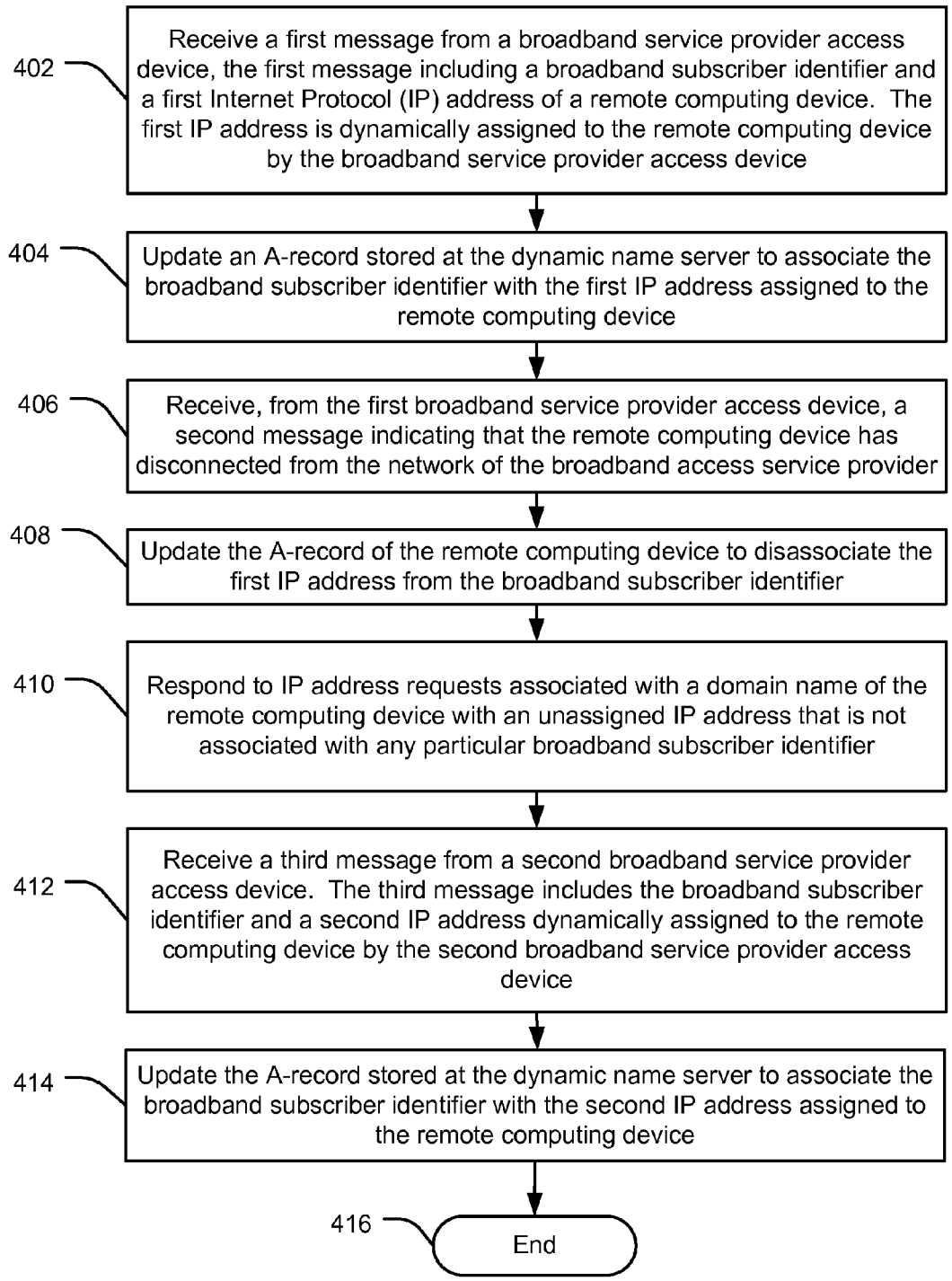
FIG. 4 is a flow diagram of a second particular embodiment of a method to provide name services for dynamically assigned IP addresses.

FIG. 4 is a flow diagram of a second particular embodiment of a method to provide name services for dynamically assigned IP addresses. The method may be performed by a domain name server, such as the domain name server 108 of FIG. 1 or the domain name server 208 of FIG. 2.

The method begins at 402, when a first message is received from a broadband service provider access device. The first message includes a broadband subscriber identifier and a first Internet Protocol (IP) address of a remote computing device. The first IP address is dynamically assigned to the remote computing device by the broadband service provider access device. Moving to 404, an A-Record stored at the domain name server is updated to associate the broadband subscriber identifier with the first IP address assigned to the remote computing device. For example, in FIG. 2, the computing device 214 may send the connection request 230 to the first broadband service provider access device 216. In response, the first broadband service provider access device 216 may assign the first IP address 236 to the computing device 214 and, substantially simultaneously, may send the first message 234 to the domain name server 208 to update the A-Record 213 to associate the subscriber ID 232 with the first IP address 236.

Advancing to 406, a second message is received from the first broadband service provider access device indicating that the remote computing device has disconnected from the network of the broadband access service provider. Advancing to 408, the A-Record of the remote computing device is updated to disassociate the IP address from the broadband service provider identifier. For example, in FIG. 2 when the first broadband service provider access device 216 determines that the computing device 214 is no longer connected to the broadband service provider network 202, the first broadband service provider access device 216 may send the second message 238 to the domain name server 208 to disassociate the subscriber ID 232 from the first IP address 236.

Continuing to 410, while the remote computing device is disconnected from the broadband service provider network, IP address requests associated with a domain name of the remote computing device are responded to with an unassigned IP address that is not associated with any particular broadband subscriber identifier. For example, in FIG. 2, the domain name server 208 may respond to the IP address request 270 by sending the unassigned IP address 271. The domain name server 208 may send the unassigned IP address 271 to prevent requests to resolve the domain name of the remote computing device 214 from resolving to an incorrect IP address (e.g., an IP address associated with a different subscriber) when the computing device 214 is disconnected from the broadband server provider network 202. To illustrate, after the computing device 214 disconnects from the broadband server provider network 202, the first IP address 236 may be assigned to a second remote computing device (not shown). The domain name server 208 may send the unassigned IP address 271 to prevent the IP address request 270 from resolving to the first IP address 236 assigned to the second remote computing device (not shown).

Moving to 412, a third message is received from a second broadband service provider access device. The third message includes the broadband subscriber identifier and a second IP address dynamically assigned to the remote computing device by the second broadband service provider access device. Proceeding to 414, the A-Record stored at the domain name server is updated to associate the broadband subscriber identifier with the second IP address assigned to the remote computing device. For example, in FIG. 2, the domain name server 208 may receive the third message 242 including the subscriber ID 232 and the second IP address 244. In response, the domain name server 208 updates the A-Record 213 to associate the subscriber ID 232 with the second IP address 244. The method ends, at 414.

Thus, a network element at the edge of a broadband service provider network may dynamically assign an IP address to a remote computing device. Substantially simultaneously with sending the dynamically assigned IP address to the remote computing device, the network element may send a message to a domain name server associated with the broadband service provider network to associate the subscriber ID of the remote computing device with the dynamically assigned IP address.

Figure 5:
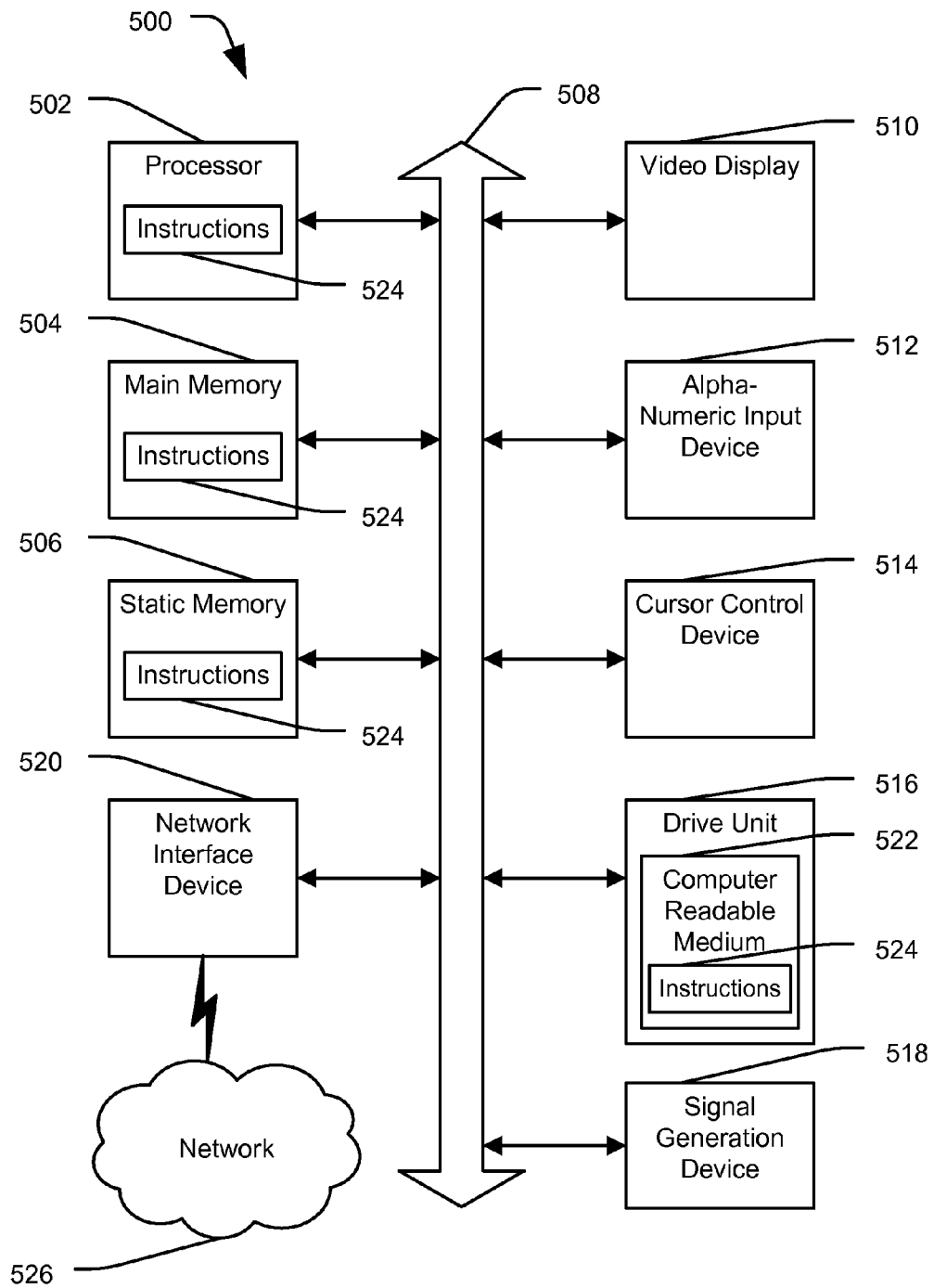
FIG. 5 is a block diagram of an illustrative embodiment of a general computer system.

Referring to FIG. 5, an illustrative embodiment of a general computer system is shown and is designated 500. The computer system 500 can include a set of instructions that can be executed to cause the computer system 500 to perform any one or more of the methods or computer based functions disclosed herein. The computer system 500, or any portion thereof, may operate as a standalone device or may be connected, e.g., using a network, to other computer systems or peripheral devices. The computer system 500 may include or be included within any one or more of the broadband service provider access device 116 of FIG. 1, the domain name server 108 of FIG. 1, the broadband service provider access devices 216-217 of FIG. 2, the domain name server 208 of FIG. 2, or any combination thereof.

In a networked deployment, the computer system 500 may operate in the capacity of a domain name server, a database server, a computing device, or any combination thereof, as described above with reference to FIGS. 1-2. The computer system 500 can also be implemented as or incorporated into various devices, such as a personal computer (PC), a tablet PC, a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics-processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, or a solid-state display. Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable storage medium that includes instructions 524 to enable a device connected to a network 526 to communicate voice, video or data over the network 526. Further, the instructions 524 may be transmitted or received over the network 526 via the network interface device 520.

While the computer-readable storage medium is shown to be a single medium, the term "computer-readable storage medium" includes a single medium or multiple media, such as a centralized or distributed database, and/or associated caches and servers that store one or more sets of instructions. The term "computer-readable storage medium" shall also include any tangible storage medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical, such as a disk or tapes or other storage device. Accordingly, the disclosure is considered to include any one or more of a computer-readable medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, VoIP, and IPTV) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A computer implemented method, comprising:
   receiving a broadband connection request from a remote computing device at a broadband service provider access device, the broadband connection request including a broadband subscriber identifier;
   dynamically assigning, at the broadband service provider access device, an internet protocol address to the remote computing device in response to receiving the broadband connection request; and
   sending, from the broadband service provider access device, an internet protocol address assignment message to the remote computing device and a message to a domain name server at substantially a same time, wherein the message to the domain name server enables the domain name server to update a record that includes a domain name associated with the broadband subscriber identifier and the internet protocol address assigned to the remote computing device to inhibit association of a stale internet protocol address with the remote computing device.

2. The computer implemented method of claim 1, further comprising determining that the remote computing device has disconnected from a network of a broadband service provider associated with the broadband service provider access device.

3. The computer implemented method of claim 2, further comprising, when the remote computing device disconnects from the broadband service provider access device, sending a second message to the domain name server, the second message indicating that the remote computing device is not connected to the network of the broadband service provider.

4. The computer implemented method of claim 3, wherein, in response to the second message, the domain name server responds to internet protocol address requests associated with a domain name of the remote computing device with an unassigned internet protocol address that is not associated with any particular broadband subscriber identifier.

5. The computer implemented method of claim 1, wherein the domain name server updates the record associated with the broadband subscriber identifier in response to receiving the message.

6. The computer implemented method of claim 1, wherein the domain name server is associated with the broadband service provider.

7. The computer implemented method of claim 1, wherein the internet protocol address assignment message includes the internet protocol address.

8. The computer implemented method of claim 1, further comprising providing a broadband connection to a network of the broadband service provider via the broadband service provide access device.

9. The computer implemented method of claim 1, further comprising:
   receiving a second broadband connection request from the remote computing device;
   dynamically assigning a second internet protocol address to the remote computing device; and
   sending a third message to the domain name server to update the record that includes the domain name associated with the broadband subscriber identifier to include the second internet protocol address assigned to the remote computing device.

10. A domain name server, comprising:
    a processor; and
    a computer-readable storage medium comprising operational instructions that, when executed by the processor, cause the processor to:
    receive a first message from a broadband service provider access device, the first message including a broadband subscriber identifier and a first internet protocol address of a remote computing device, the first internet protocol address dynamically assigned to the remote computing device by the broadband service provider access device, wherein the first message is sent from the broadband service provider access device at substantially a same time when the broadband service provider access device sends an assignment message to the remote computing device to inhibit association of a stale internet protocol address with the remote computing device, the assignment message including the first internet protocol address assigned to the remote computing device; and update an address-record stored at the domain name server to associate the broadband subscriber identifier with the first internet protocol address assigned to the remote computing device.

11. The domain name server of claim 10, wherein the operational instructions are further executable by the processor to:

receive, from the broadband service provider access device, a second message indicating that the remote computing device has disconnected from a network of a broadband access service provider associated with the broadband service provider access device; and update the address-record to disassociate the first internet protocol address from the broadband subscriber identifier.

12. The domain name server of claim 11, wherein the operational instructions are further executable by the processor to respond to an internet protocol address request associated with a domain name of the remote computing device with an unassigned internet protocol address that is not associated with any particular broadband subscriber identifier.

13. The domain name server of claim 12, wherein the operational instructions are further executable by the processor to:

receive a third message from a second broadband service provider access device, the third message including the broadband subscriber identifier and a second internet protocol address dynamically assigned to the remote computing device by the second broadband service provider access device; and update the address-record stored at the domain name server to associate the broadband subscriber identifier with the second internet protocol address assigned to the remote computing device.

14. The domain name server of claim 10, wherein the address-record maps the first internet protocol address to a particular domain name.

15. A computer-readable storage device comprising operational instructions that, when executed by a processor, cause the processor to perform operations including:

receiving a broadband connection request from a remote computing device, the broadband connection request including a broadband subscriber identifier;

dynamically assigning an internet protocol address to the remote computing device in response to receiving the broadband connection request;

sending an internet protocol address assignment message to the remote computing device; and sending a message to a domain name server at substantially a same time as the internet protocol address assignment message is sent, wherein the message to the domain name server enables the domain name server to update a record that includes a domain name associated with the broadband subscriber identifier and the internet protocol address assigned to the remote computing device to inhibit association of a stale internet protocol address with the remote computing device.

16. The computer-readable storage device of claim 15, wherein the operations further include providing a broadband connection to a network.

17. The computer-readable storage device of claim 15, wherein the operations further include determining that the remote computing device has disconnected from a network.

18. The computer-readable storage device of claim 17, wherein the operations further include sending a second message to the domain name server to disassociate the internet protocol address from the broadband subscriber identifier.

19. The computer-readable storage device of claim 18, wherein the operations further include:

receiving a second broadband connection request from the remote computing device; and dynamically assigning a second internet protocol address to the remote computing device.

20. The computer-readable storage device of claim 15, wherein the internet protocol address assignment message includes the internet protocol address.

* * * * *